US009458603B2

(12) United States Patent
Enomoto

(10) Patent No.: US 9,458,603 B2
(45) Date of Patent: Oct. 4, 2016

(54) WHEEL LOADER AND CONTROL METHOD FOR WHEEL LOADER

(71) Applicant: KOMATSU LTD., Tokyo (JP)

(72) Inventor: Ryota Enomoto, Komatsu (JP)

(73) Assignee: KOMATSU LTD., Tokyo (JP)

( * ) Notice: Subject to any disclaimer, the term of this patent is extended or adjusted under 35 U.S.C. 154(b) by 0 days.

(21) Appl. No.: 14/420,080

(22) PCT Filed: Oct. 31, 2014

(86) PCT No.: PCT/JP2014/079093
§ 371 (c)(1),
(2) Date: Feb. 6, 2015

(87) PCT Pub. No.: WO2015/064747
PCT Pub. Date: May 7, 2015

(65) Prior Publication Data
US 2016/0122977 A1 May 5, 2016

(51) Int. Cl.
*G06F 7/70* (2006.01)
*E02F 3/08* (2006.01)
(Continued)

(52) U.S. Cl.
CPC . *E02F 9/20* (2013.01); *E02F 3/34* (2013.01); *E02F 3/42* (2013.01); *E02F 9/02* (2013.01); *E02F 9/2079* (2013.01); *E02F 9/2253* (2013.01); *E02F 9/2292* (2013.01); *E02F 9/2296* (2013.01); *F02D 11/105* (2013.01); *F02D 29/04* (2013.01); *F02D 41/021* (2013.01); *F02D 41/1497* (2013.01);
(Continued)

(58) Field of Classification Search
USPC ............................................... 701/50; 37/388
See application file for complete search history.

(56) References Cited

U.S. PATENT DOCUMENTS 4,704,922 A 11/1987 Suketomo et al.
4,726,186 A 2/1988 Tatsumi et al.
(Continued)

FOREIGN PATENT DOCUMENTS

EP 2 444 635 A1 4/2012
EP 2 444 637 A1 4/2012
(Continued)

OTHER PUBLICATIONS

The Office Action for the corresponding Japanese application No. 2014-555643, issued on Jun. 2, 2015.
(Continued)

*Primary Examiner* — Thomas G Black
*Assistant Examiner* — Tyler Paige
(74) *Attorney, Agent, or Firm* — Global IP Counselors, LLP

(57) ABSTRACT

A level selecting unit is a device for selecting a tractive force level from a plurality of levels when a velocity stage of a transmission is a first velocity. The plurality of levels includes at least a first level and a second level. A control unit controls the engine. When the velocity stage of the transmission is the first velocity and the first level is selected, the control unit controls the engine on the basis of a first tractive force characteristic. The first tractive force characteristic prescribes a relationship between the vehicle speed and the tractive force of the vehicle. When the velocity stage of the transmission is the first velocity and the second level is selected, the control unit controls the engine on the basis of a second tractive force characteristic. The tractive force is reduced more in the second tractive force characteristic than in the first tractive force characteristic.

16 Claims, 12 Drawing Sheets

(51) Int. Cl.

| | |
|---|---|
| ***E02F 9/20*** | (2006.01) |
| ***E02F 9/22*** | (2006.01) |
| ***F02D 29/04*** | (2006.01) |
| ***F02D 41/02*** | (2006.01) |
| ***F02D 41/14*** | (2006.01) |
| ***F02D 41/24*** | (2006.01) |
| ***F02D 11/10*** | (2006.01) |
| ***E02F 3/34*** | (2006.01) |
| ***E02F 3/42*** | (2006.01) |
| ***E02F 9/02*** | (2006.01) |

(52) U.S. Cl.

CPC .... *F02D 41/2422* (2013.01); *F02D 2200/501* (2013.01); *F02D 2250/18* (2013.01)

(56) References Cited

U.S. PATENT DOCUMENTS

| | | | | |
|---|---|---|---|---|
| 6,122,848 | A * | 9/2000 | Fukuda | E02F 3/431 37/382 |
| 6,566,837 | B1 * | 5/2003 | Zhang | G05B 19/19 318/610 |
| 6,582,340 | B1 | 6/2003 | Arie et al. | |
| 7,661,499 | B2 * | 2/2010 | Matsuyama | E02F 9/2246 180/170 |
| 2008/0282583 | A1 * | 11/2008 | Koellner | E02F 3/304 37/348 |
| 2009/0240404 | A1 | 9/2009 | Matsuyawa | |
| 2011/0040458 | A1 | 2/2011 | Nakagawa et al. | |
| 2011/0308879 | A1 * | 12/2011 | Shirao | B60W 10/06 180/306 |
| 2012/0095655 | A1 | 4/2012 | Hyodo et al. | |
| 2012/0100959 | A1 | 4/2012 | Hyodo et al. | |
| 2012/0310494 | A1 | 12/2012 | Asami et al. | |
| 2013/0041561 | A1 * | 2/2013 | Asami | E02F 9/2246 701/50 |
| 2013/0260962 | A1 * | 10/2013 | Li | B60W 10/06 477/107 |
| 2014/0039767 | A1 * | 2/2014 | Jensen | B60K 23/0808 701/50 |
| 2014/0039772 | A1 * | 2/2014 | Jensen | B60K 23/0808 701/69 |
| 2014/0121911 | A1 * | 5/2014 | Davis | B60W 10/103 701/51 |
| 2014/0129114 | A1 * | 5/2014 | Nishimura | B60W 10/06 701/102 |
| 2014/0196449 | A1 * | 7/2014 | Petty | F16H 61/421 60/487 |

FOREIGN PATENT DOCUMENTS

| | | | |
|---|---|---|---|
| EP | 2 687 638 | A1 | 1/2014 |
| JP | 62-106152 | A | 5/1987 |
| JP | 62-156440 | A | 7/1987 |
| JP | 63-16155 | A | 1/1988 |
| JP | 4-76126 | A | 3/1992 |
| JP | 4-203430 | A | 7/1992 |
| JP | 2001-152921 | A | 6/2001 |
| JP | 2007-182859 | A | 7/2007 |
| JP | 2012-241661 | A | 12/2012 |

OTHER PUBLICATIONS

The Office Action for the corresponding extended European search report for the application No. 14833567.2, issued on Oct. 5, 2015.

The International Search Report for the corresponding international application No. PCT/JP2014/079093, issued on Jan. 27, 2015.

* cited by examiner (A)

| High-output mode | | | | | |
|---|---|---|---|---|---|
| Level 1 | | | Level 2 | | |
| Vehicle speed (km/h) | Throttle upper limit (%) | Torque reduction amount (Nm) | Vehicle speed (km/h) | Throttle upper limit (%) | Torque reduction amount (Nm) |
| V1 | 100 | 0 | V1 | Th1 | Tq1 |
| V2 | 100 | 0 | V2 | Th2 | Tq2 |
| V3 | 100 | 0 | V3 | Th3 | Tq3 |
| V4 | 100 | 0 | V4 | Th4 | Tq4 |
| V5 | 100 | 0 | V5 | Th5 | Tq5 |

(B)

| Low-output mode | | | | | |
|---|---|---|---|---|---|
| Level 1 | | | Level 2 | | |
| Vehicle speed (km/h) | Throttle upper limit (%) | Torque reduction amount (Nm) | Vehicle speed (km/h) | Throttle upper limit (%) | Torque reduction amount (Nm) |
| V1 | 100 | 0 | V1 | 100 | 0 |
| V2 | 100 | 0 | V2 | 100 | 0 |
| V3 | 100 | 0 | V3 | 100 | 0 |
| V4 | 100 | 0 | V4 | 100 | 0 |
| V5 | 100 | 0 | V5 | 100 | 0 |

FIG. 6

FIG. 11

(A)

| High-output mode | | | | | | | | |
|---|---|---|---|---|---|---|---|---|
| Level 1 | | | Level 2 | | | Level 3 | | |
| Vehicle speed (km/h) | Throttle upper limit (%) | Torque reduction amount (Nm) | Vehicle speed (km/h) | Throttle upper limit (%) | Torque reduction amount (Nm) | Vehicle speed (km/h) | Throttle upper limit (%) | Torque reduction amount (Nm) |
| V1 | 100 | 0 | V1 | Th1 | Tq1 | V1 | Th6 | Tq6 |
| V2 | 100 | 0 | V2 | Th2 | Tq2 | V2 | Th7 | Tq7 |
| V3 | 100 | 0 | V3 | Th3 | Tq3 | V3 | Th8 | Tq8 |
| V4 | 100 | 0 | V4 | Th4 | Tq4 | V4 | Th9 | Tq9 |
| V5 | 100 | 0 | V5 | Th5 | Tq5 | V5 | Th10 | Tq10 |

(B)

| Low-output mode | | | | | | | | |
|---|---|---|---|---|---|---|---|---|
| Level 1 | | | Level 2 | | | Level 3 | | |
| Vehicle speed (km/h) | Throttle upper limit (%) | Torque reduction amount (Nm) | Vehicle speed (km/h) | Throttle upper limit (%) | Torque reduction amount (Nm) | Vehicle speed (km/h) | Throttle upper limit (%) | Torque reduction amount (Nm) |
| V1 | 100 | 0 | V1 | 100 | 0 | V1 | Th16 | Tq16 |
| V2 | 100 | 0 | V2 | 100 | 0 | V2 | Th17 | Tq17 |
| V3 | 100 | 0 | V3 | 100 | 0 | V3 | Th18 | Tq18 |
| V4 | 100 | 0 | V4 | 100 | 0 | V4 | Th19 | Tq19 |
| V5 | 100 | 0 | V5 | 100 | 0 | V5 | Th20 | Tq20 |

WHEEL LOADER AND CONTROL METHOD FOR WHEEL LOADER

CROSS-REFERENCE TO RELATED APPLICATIONS

This application is a U.S. National stage application of International Application No. PCT/JP2014/079093, filed on Oct. 31, 2014.

FIELD OF THE INVENTION

The present invention relates to a wheel loader and a control method for a wheel loader.

A wheel loader is equipped with a work implement having a bucket. The wheel loader performs various types of work, such as excavating by using the work implement. Excavating work by a wheel loader involves plunging the bucket into an object, such as a mound of dirt, while moving forward, and then loading the object into the bucket by raising the work implement.

While the bucket is plunged into the object, the tractive force of the vehicle acts as a counterforce to the lifting force for raising the work implement. As a result, when the tractive force is too large, the work implement cannot be raised.

Accordingly, Japanese Patent Laid-open No. 2007-182859, for example, reduces the tractive force by limiting a throttle upper limit when the vehicle speed is at or lower than a prescribed velocity. As a result, the inability to raise the work implement is reduced.

SUMMARY

As mentioned above, the wheel loader plunges the bucket into the object while traveling toward the object during excavating work. Therefore, as illustrated in FIG. 13(A), when a tractive force F is too large at the moment that the bucket plunges into a lightweight or loose object, a penetration amount D of the bucket into the object becomes too large as illustrated in FIG. 13(B). That is, the bucket plunges into the object deeper than the amount assumed by the operator. In this case, the work implement cannot be raised upward as illustrated in FIG. 13(C). Consequently, the problems of reduced workability or of deteriorated fuel consumption occurs.

Alternatively, when the tractive force is too large at the moment the bucket plunges into the object when the ground is slippery, there is a concern that the traveling wheels of the wheel loader may slip. The problem of a reduction in workability or a deterioration in fuel consumption may also occur in this case.

An object of the present invention is to provide a wheel loader that is able to optimize a tractive force at the moment of plunging a bucket into an object during excavating work in accordance with the type of object and the ground conditions, and a control method for the wheel loader.

A wheel loader according to a first aspect of the present invention includes an engine, a hydraulic pump, a work implement, traveling wheels, a travel drive device, a level selecting unit, and a control unit. The hydraulic pump is driven by the engine. The work implement has a bucket and is driven by hydraulic fluid discharged from the hydraulic pump. The traveling wheels are driven by the engine. The travel drive device has a torque converter and a transmission. The travel drive device transmits driving power from the engine to the traveling wheels. The level selecting unit is a device for selecting a tractive force level from a plurality of levels when a gear stage of the transmission is a first-speed gear. The plurality of levels includes at least a first level and a second level. The control unit controls the engine. When the gear stage of the transmission is the first-speed gear and the first level is selected, the control unit controls the engine on the basis of a first tractive force characteristic. The first tractive force characteristic prescribes a relation between the vehicle speed and the tractive force of the vehicle. When the gear stage of the transmission is the first-speed gear and the second level is selected, the control unit controls the engine on the basis of a second tractive force characteristic. The tractive force is reduced more in the second tractive force characteristic than in the first tractive force characteristic.

In this case, the operator of the wheel loader is able to select a tractive force level at the first-speed gear from the plurality of levels. When the first level is selected, the engine is controlled on the basis of the first tractive force characteristic. When the second level is selected, the engine is controlled on the basis of the second tractive force characteristic whereby the tractive force is reduced more than in the first level. As a result, the wheel loader is able to refine the tractive force at the moment of plunging a bucket into an object during excavating work in response to the type of object and the ground conditions.

Therefore, the penetration amount of the bucket into the object can be suppressed from becoming too large by the operator selecting a tractive force level in the first-speed gear in accordance with the object. Alternatively, slipping of the traveling wheels can be suppressed by the operator selecting a tractive force level in the first-speed gear in accordance with the ground conditions. As a result, a reduction in workability or a deterioration in fuel consumption can be suppressed. The gear stage is normally set to the first-speed gear while performing excavating work. As a result, the tractive force can be appropriately reduced during the excavating work.

A difference between the tractive force of the first level and the tractive force of the second level preferably decreases in correspondence with a decrease in the vehicle speed. In this case, the tractive force becoming too small when the vehicle speed approaches zero can be suppressed.

The control unit preferably reduces the tractive force of the second level more than the tractive force of the first level by reducing a throttle upper limit of the engine. In this case, the tractive force can be reduced by reducing the throttle upper limit of the engine.

The control unit preferably reduces the tractive force of the second level more than the tractive force of the first level by reducing an upper limit of an output torque of the engine. In this case, the tractive force can be reduced by reducing the upper limit of the output torque of the engine. In particular, the tractive force can be controlled in a more responsive manner because the output torque of the engine can be changed directly in comparison to changing the throttle upper limit.

The control unit preferably reduces the tractive force of the second level more than the tractive force of the first level by reducing the throttle upper limit of the engine and by reducing the upper limit of the output torque of the engine. In this case, the tractive force can be reduced by reducing the throttle upper limit of the engine and the upper limit of the output torque of the engine.

The control unit preferably sets a reduction amount of the upper limit of the output torque of the engine to zero when the rotation speed of the engine is equal to or less than a prescribed rotation speed. In this case, a drop in the tractive force while the rotation speed of the engine is low can be suppressed. As a result, the occurrence of engine stall can be suppressed.

The wheel loader preferably further includes a shifting-down operating member. The shifting-down operating member is a member for changing the gear stage of the transmission from the current gear stage to a low-speed gear stage. The control unit preferably switches the tractive force level from the second level to the first level when the shifting-down operating member is operated while the tractive force level is the second level. In this case, the operator is able to easily switch the tractive force level to the first level by operating the shifting-down operating member even when the tractive force level is set to the second level. As a result, the operator is able to easily increase the tractive force.

The plurality of levels preferably further includes a third level. When the gear stage of the transmission is the first-speed gear and the third level is selected, the control unit preferably controls the engine on the basis of a third tractive force characteristic. The tractive force is reduced more in the third tractive force characteristic than in the second tractive force characteristic. In this case, the operator is able to further reduce the tractive force by setting the tractive force level to the third level.

The wheel loader preferably further includes a mode selecting unit for selecting a control mode of the tractive force from a plurality of modes that includes a high-output mode and a low-output mode. The tractive force in the low-output mode is smaller than the tractive force in the high-output mode. In this case, the operator is able to set the magnitude of the tractive force by selecting the control mode. For example, work can be performed with a large tractive force by the selection of the high-output mode. Accordingly, workability can be improved. The tractive force can be suppressed during other work besides excavating by the selection of the low-output mode. Accordingly, fuel consumption can be improved.

The tractive force level is preferably set for each of the high-output mode and the low-output mode. In this case, the operator is able to select a tractive force level at the first-speed gear in the high-output mode from the plurality of levels. The operator is also able to select a tractive force level at the first-speed gear in the low-output mode from the plurality of levels.

The tractive force level is preferably set to only the high-output mode. In this case, the operator is able to select a tractive force level at the first-speed gear in the high-output mode from the plurality of levels.

The tractive force when the control mode of the tractive force is the high-output mode and the tractive force level is the third level is preferably the same as the tractive force when the control mode of the tractive force is the low-output mode and the tractive force level is the third level. In this case, an excessive reduction in the tractive force can be suppressed when the control mode of the tractive force is the low-output mode and the tractive force level is the third level.

The tractive force when the control mode of the tractive force is the low-output mode and the tractive force level is the first level is preferably the same as the tractive force when the control mode of the tractive force is the low-output mode and the tractive force level is the second level. In this case, an excessive reduction in the tractive force can be suppressed when the control mode of the tractive force is the low-output mode and the tractive force level is the second level.

When the gear stage of the transmission is a second-speed gear, the control unit preferably controls the engine on the basis of a tractive force characteristic of the second-speed gear. The tractive force of the second level at the first-speed gear is preferably larger than the tractive force at the second-speed gear in a velocity range equal to or less than at least a prescribed vehicle speed. In this case, the tractive force of the second level at the first-speed gear is of a magnitude between the tractive force of the first level at the first-speed gear and the tractive force of the second-speed gear in the velocity range equal to or below the prescribed vehicle speed. As a result, when the tractive force in the first level at the first-speed gear is too large and the tractive force at the second-speed gear is too small, a suitable tractive force can be obtained by selecting the second level.

The control method according to another aspect of the present invention is a control method for a wheel loader. The wheel loader includes an engine, a hydraulic pump, a work implement, traveling wheels, and a travel drive device. The hydraulic pump is driven by the engine. The work implement has a bucket and is driven by hydraulic fluid discharged from the hydraulic pump. The traveling wheels are driven by the engine. The travel drive device has a torque converter and a transmission. The travel drive device transmits driving power from the engine to the traveling wheels. The control method according to the present aspect includes the following steps. In a first step, a level selected from a plurality of levels is set as a tractive force level when the gear stage of the transmission is the first-speed gear. The plurality of levels includes at least a first level and a second level. In a second step, when the gear stage of the transmission is the first-speed gear and the second level is selected, the engine is controlled on the basis of a second tractive force characteristic having a tractive force reduced more than that of a first tractive force characteristic when the first level is selected.

In this case, the operator of the wheel loader is able to select a tractive force level at the first-speed gear from the plurality of levels. When the first level is selected, the engine is controlled on the basis of the first tractive force characteristic. When the second level is selected, the engine is controlled on the basis of the second tractive force characteristic whereby the tractive force is reduced more than in the first level. As a result, the wheel loader is able to refine a tractive force at the moment of plunging a bucket into an object during excavating work in accordance with the type of object and the ground conditions.

Therefore, the penetration amount of the bucket into the object can be suppressed from becoming too large by the operator selecting a tractive force level in the first-speed gear in accordance with the object. Alternatively, slipping of the traveling wheel can be suppressed by the operator selecting a tractive force level in the first-speed gear in accordance with the ground conditions. As a result, a reduction in workability or a deterioration in fuel consumption can be suppressed. The gear stage is normally set to the first-speed gear while performing excavating work. As a result, the tractive force can be suitably reduced during the excavating work.

According to the present invention, a wheel loader and a control method for the wheel loader can be provided that are able to refine a tractive force at the moment of plunging a bucket into an object during excavating work in response to the type of object and the ground conditions.

BRIEF DESCRIPTION OF DRAWINGS

FIG. 6 illustrates tractive force reduction information.

FIG. 11 illustrates tractive force reduction information according to the second exemplary embodiment.

DESCRIPTION OF EXEMPLARY EMBODIMENTS

Figure 1:
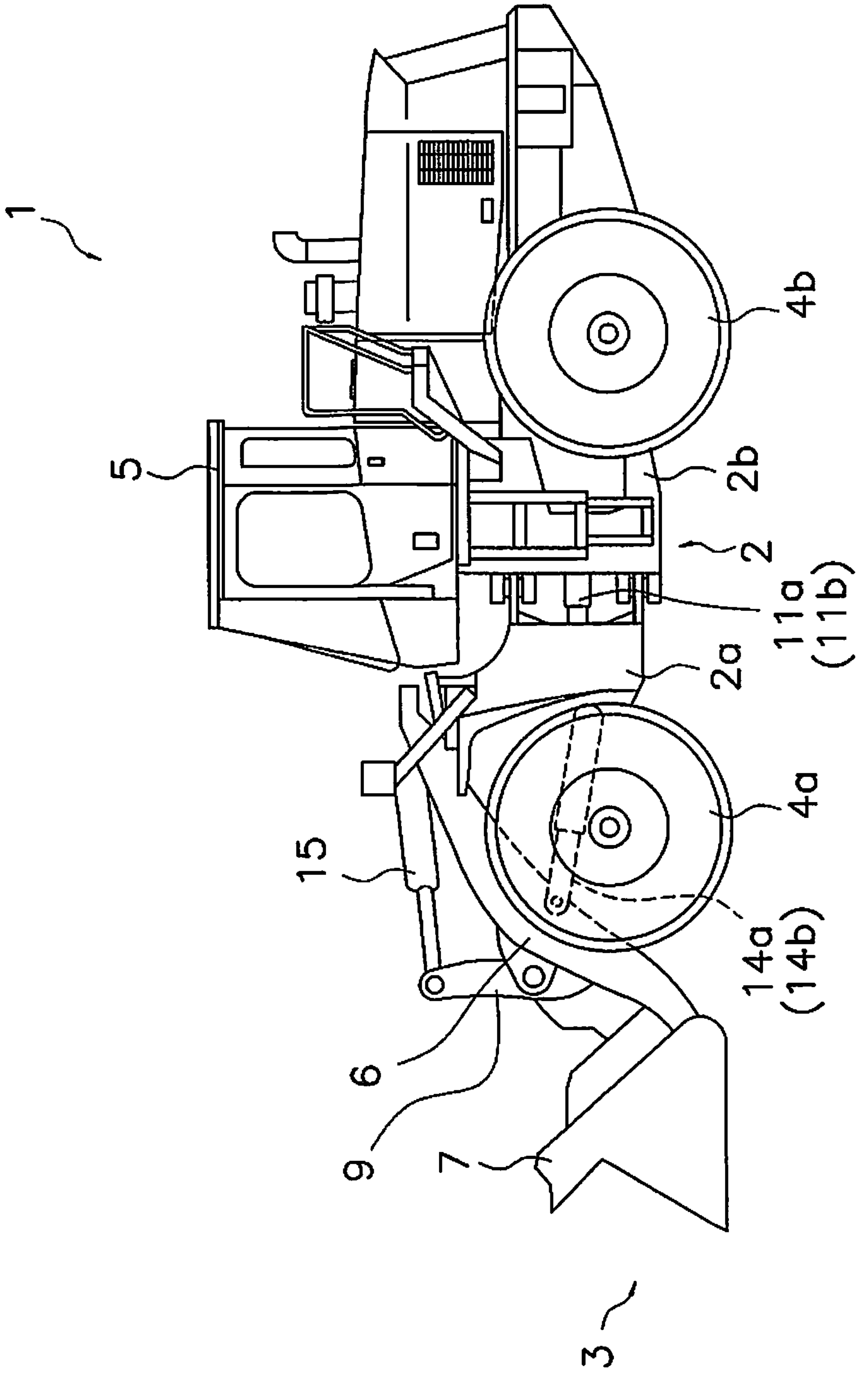
FIG. 1 is a side view of a wheel loader according to a first exemplary embodiment of the present invention.
Figure 2:
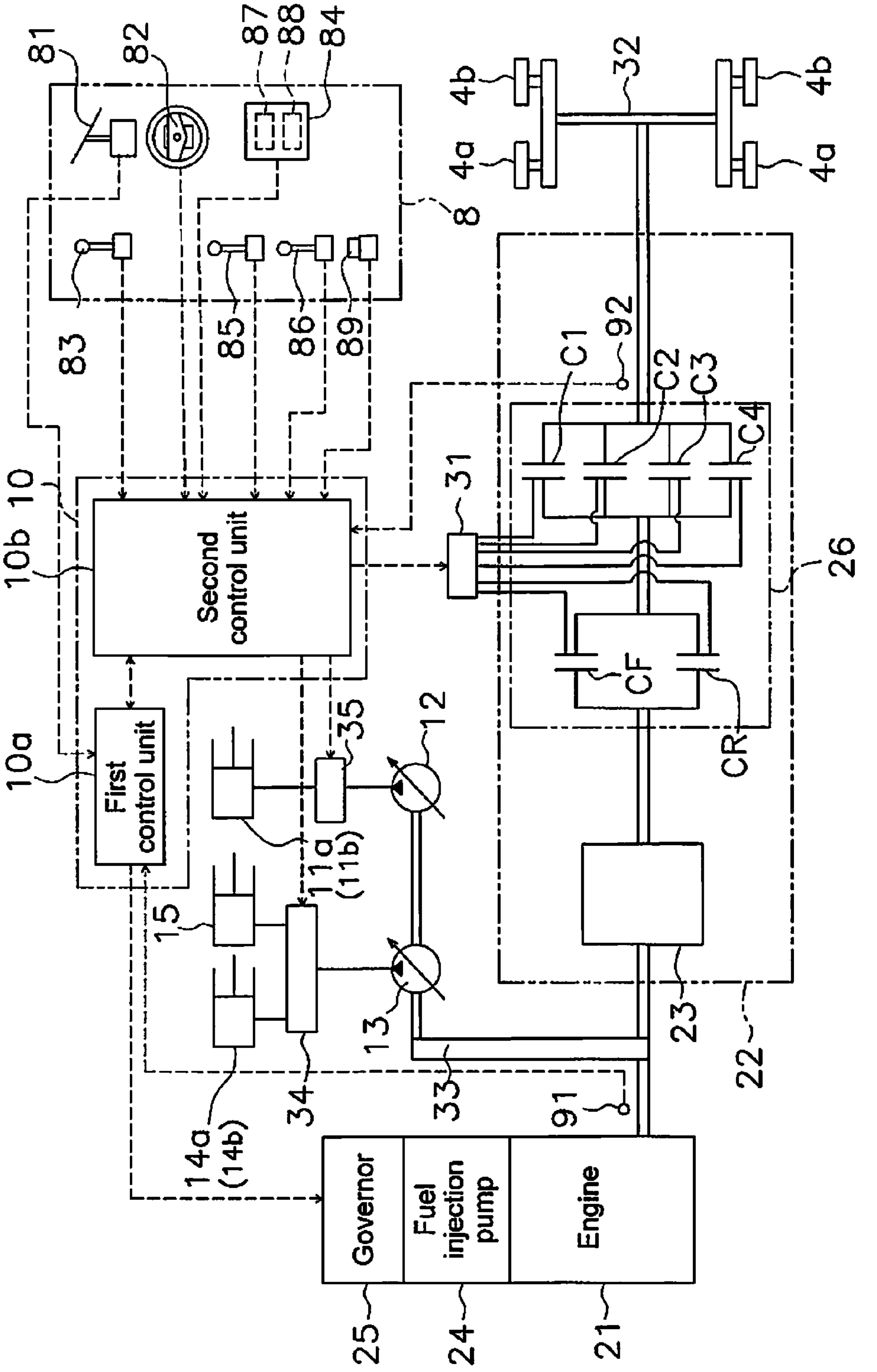
FIG. 2 is a schematic view of a configuration of the wheel loader.

A wheel loader according to the exemplary embodiments will be explained below with reference to the drawings. FIG. 1 is a side view of a wheel loader 1 according to a first exemplary embodiment. FIG. 2 is a schematic view of a configuration of the wheel loader 1. The wheel loader 1 according to the present exemplary embodiment is a wheel loader. The wheel loader 1 includes a vehicle body frame 2, a work implement 3, traveling wheels 4*a* and 4*b*, and an operating cabin 5 as illustrated in FIG. 1.

The vehicle frame 2 has a front body part 2*a* and a rear body part 2*b*. The front body part 2*a* and the rear body part 2*b* are connected to each other to allow swinging in the left-right direction. A pair of steering cylinders 11*a* and 11*b* are provided across the front body part 2*a* and the rear body part 2*b*. The steering cylinders 11*a* and 11*b* are hydraulic cylinders driven by hydraulic fluid from a steering pump 12 illustrated in FIG. 2. The front body part 2*a* swings relative to the rear body part 2*b* due to the extension and contraction of the steering cylinders 11*a* and 11*b*. As a result, the travel direction of the vehicle is changed. Only one of the steering cylinders 11*a* and 11*b* is illustrated in FIG. 1 and FIG. 2 and the other is omitted.

The work implement 3 and the pair of traveling wheels 4*a* are attached to the front body part 2*a*. The work implement 3 is driven by hydraulic fluid from a work implement pump 13 illustrated in FIG. 2. The work implement 3 has a boom 6, a pair of lift cylinders 14*a* and 14*b*, a bucket 7, a bucket cylinder 15, and a bell crank 9.

The boom 6 is mounted on the front body part 2*a*. One end of each of the lift cylinders 14*a* and 14*b* is attached to the front body part 2*a*. The other end of each of the lift cylinders 14*a* and 14*b* is attached to the boom 6. The boom 6 swings up and down due to the extension and contraction of the lift cylinders 14*a* and 14*b* due to hydraulic fluid from the work implement pump 13.

Only one of the lift cylinders 14*a* and 14*b* is illustrated in FIG. 1 and FIG. 2 and the other is omitted. The bucket 7 is attached to the tip of the boom 6. One end of the bucket cylinder 15 is attached to the front body part 2*a*. The other end of the bucket cylinder 15 is attached to the bucket 7 via the bell crank 9. The bucket 7 swings up and down due to the extension and contraction of the bucket cylinder 15 due to hydraulic fluid from the work implement pump 13.

The operating cabin 5 and the pair of traveling wheels 4*b* are attached to the rear body part 2*b*. The operating cabin 5 is mounted on an upper part of the vehicle frame 2. A seat for the operator and a below-mentioned operating unit 8 are disposed in the operating cabin 5.

As illustrated in FIG. 2, the wheel loader 1 includes an engine 21, a travel drive device 22, the work implement pump 13, the steering pump 12, the operating unit 8, and a control unit 10.

The engine 21 is, for example, a diesel engine. The output of the engine 21 is controlled by adjusting the amount of fuel injected into the cylinders of the engine 21. This adjustment is carried due to a below-mentioned first control unit 10*a* controlling an electronic governor 25 attached to a fuel injection pump 24 of the engine 21. A general all-speed control system governor may be used as the governor 25. The governor 25 adjusts the engine rotation speed and the fuel injection amount in response to a load so that the engine rotation speed matches a target rotation speed in accordance with an operation amount of a below-mentioned accelerator operating member 81. That is, the governor 25 increases and decreases the fuel injection amount to eliminate the difference between the target rotation speed and the actual engine rotation speed. The engine rotation speed is detected by an engine rotation speed sensor 91. A detection signal from the engine rotation speed sensor 91 is inputted into the first control unit 10*a*.

The travel drive device 22 transmits driving power from the engine 21 to the traveling wheels 4*a* and 4*b*. The travel drive device 22 has a torque converter 23 and a transmission 26. The torque converter 23 transmits the driving power from the engine 21 using oil as a medium. The input shaft of the torque converter 23 is coupled to the output shaft of the engine 21. The output shaft of the torque converter 23 is coupled to the input shaft of the transmission 26.

The transmission 26 transmits the driving power from the torque converter 23 to the traveling wheels 4*a* and 4*b*. The transmission 26 has a forward clutch CF and a reverse clutch CR. The vehicle can be switched between forward and reverse travel by switching the coupled state/non-coupled state of the each of clutches CF and CR. The vehicle enters a neutral state when both the clutches CF and CR are in the non-coupled state.

The transmission 26 has a plurality of gear stage clutches C1 to C4, and is able to switch the speed reduction ratio among a plurality of stages. Four gear stage clutches C1 to C4 are provided in the transmission 26 in the present exemplary embodiment. Therefore, the transmission 26 is able to switch the gear stages among the four stages from the first-speed gear to a fourth-speed gearfourth-speed gear. The number of gear stages is not limited to four and may be less than four or greater than four.

The gear stage clutches C1 to C4 are hydraulic clutches. Hydraulic fluid is supplied from a hydraulic pump which is not illustrated through a clutch control valve 31 to the clutches C1 to C4. The clutch control valve 31 is controlled by a second control unit 10*b*, and the coupled state and the non-coupled state of each of the clutches C1 to C4 are switched by controlling the supply of hydraulic fluid to the clutches C1 to C4.

A T/M output rotation speed sensor 92 for detecting the rotation speed of the output shaft of the transmission 26 is provided on the output shaft of the transmission 26. A detection signal from the T/M output rotation speed sensor 92 is inputted into the second control unit 10*b*. The second control unit 10*b* calculates the vehicle speed on the basis of the detection signal from the TIM output rotation speed sensor 92. Therefore, the transmission output rotation speed sensor 92 functions as a vehicle speed sensor for detecting the vehicle speed. Note that a sensor for detecting the rotation speed of another portion instead of the output shaft of the transmission 26 may be used as the vehicle speed sensor. The driving power outputted from the transmission 26 is transmitted through a shaft 32 and the like to the traveling wheels 4*a* and 4*b*. As a result, the wheel loader is able to travel.

A portion of the driving power from the engine 21 is transmitted through a PTO shaft 33 to the work implement pump 13 and the steering pump 12. The work implement pump 13 and the steering pump 12 are hydraulic pumps driven by driving power from the engine 21. The hydraulic fluid discharged from the work implement pump 13 is supplied to the lift cylinders 14*a* and 14*b* and the bucket cylinder 15 through a work implement control valve 43. The hydraulic fluid discharged from the steering pump 12 is supplied to the steering cylinders 11*a* and 11*b* through a steering control valve 35. In this way, the work implement 3 is driven by a portion of the driving power from the engine 21.

The control unit 10 has the first control unit 10*a* and the second control unit 10*b*. The first control unit 10*a* and the second control unit 10*b* can each be realized by a computer having a storage device used, for example, as a program memory or a work memory and a CPU for executing programs. The control unit 10 is programmed to execute the below-mentioned controls. The controls by the control unit 10 are described in detail below.

The operating unit 8 is operated by the operator. The operating unit 8 has an accelerator operating member 81, a steering operating member 82, a work implement operating member 83, a speed change operating member 85, a forward and reverse switch operating member 86 (referred to below as an "FR operating member 86"), and a shifting-down operating member 89.

The accelerator operating member 81 is, for example, an accelerator pedal. The accelerator operating member 81 is operated to set a target rotation speed of the engine 21. Signals that indicate the operating amount of the accelerator operating member 81 (referred to below as "accelerator operating amount") are inputted into the first control unit 10*a*.

The steering operating member 82 is, for example, a steering wheel and is operated to manipulate the travel direction of the vehicle. Signals indicating the position of the steering operating member 82 are inputted into the second control unit 10*b*. The second control unit 10*b* controls the steering control valve 35 in accordance with the position of the steering operating member 82. As a result, the steering cylinders 11*a* and 11*b* are extended and contracted and the traveling direction of the wheel loader 1 is changed.

The work implement operating member 83 is, for example, an operation lever. The work implement operating member 83 may be configured as a plurality of operating levers. The work implement operating member 83 is operated to actuate the work implement 3. That is, the work implement operating member 83 is operated to actuate the boom 6 and the bucket 7. Signals indicating the position of the work implement operating member 83 are inputted into the second control unit 10*b*. The second control unit 10*b* controls the work implement control valve 34 in accordance with the position of the work implement operating member 83. As a result, the lift cylinders 14*a* and 14*b* and the bucket cylinder 15 are extended and contracted to actuate the boom 6 and the bucket 7.

The speed change operating member 85 is, for example, a shift lever. The speed change operating member 85 is operated to set the upper limit of the gear stages when an automatic speed change mode is selected. For example, when the speed change operating member 85 is set to a third-speed gearthird-speed gear, the transmission 26 is switched from the second-speed gear up to the third-speed gear in accordance with the vehicle speed, but cannot be switched to the fourth-speed gear. When the manual speed change mode is selected, the transmission 26 is switched to the gear stage set with the speed change operating member 85. Signals indicating the position of the speed change operating member 85 are inputted into the second control unit 10*b*. The second control unit 10*b* controls the change of speed of the transmission 26 in accordance with a position of the speed change operating member 85. The automatic speed change mode and the manual speed change mode are switched by the operator using a speed change mode switching member which is not illustrated.

The FR operating member 86 is operated to switch between forward travel and reverse travel of the wheel loader 1. The FR operating member 86 can be switched to each of the positions of forward travel, neutral, and reverse travel. Signals indicating the position of the FR operating member 86 are inputted into the second control unit 10*b*. The second control unit 10*b* controls the clutch control valve 31 in accordance with the position of the FR operating member 86. As a result, the forward clutch CF and the reverse clutch CR are controlled to allow switching among forward travel, reverse travel and the neutral state of the vehicle.

The shifting-down operating member 89 is operated to switch the gear stage of the transmission 26 from the current gear stage to the one gear stage therebelow when the automatic speed change mode is selected. The shifting-down operating member 89 is a switch provided on, for example, the speed change operating member 85. When the shifting-down operating member 89 is operated, a signal indicating that the shifting-down operating member 89 has been operated is inputted into the second control unit 10*b*. When an operation of the shifting-down operating member 89 is detected, the second control unit 10*b* switches the gear stage of the transmission 26 down by one gear stage.

Figure 3:
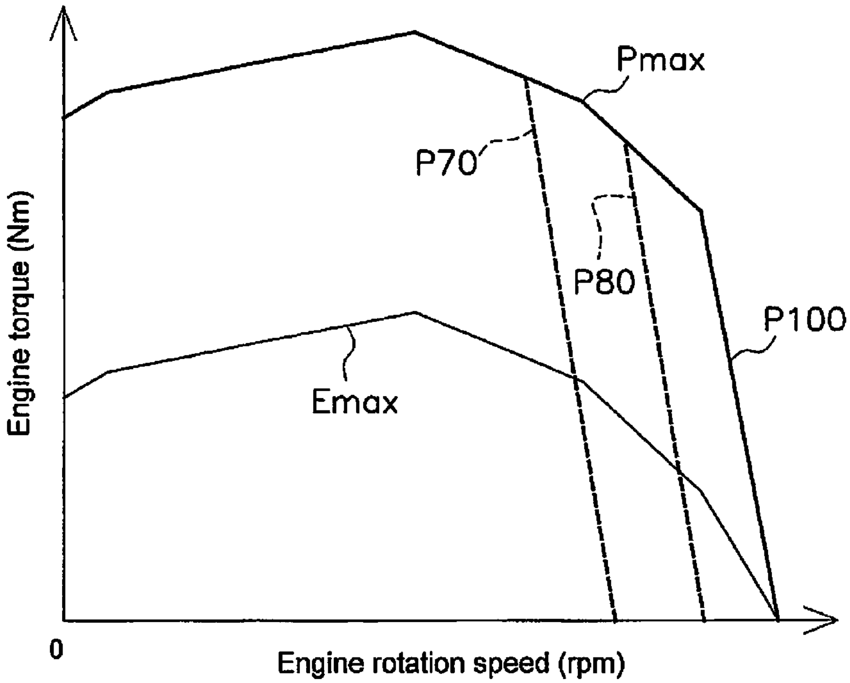
FIG. 3 illustrates an example of an engine torque curve.

The first control unit 10*a* sends engine command signals to the governor 25 so that the target rotation speed is obtained in accordance with the accelerator operating amount. FIG. 3 illustrates an engine torque curve that expresses the relation between the rotation speed of the engine 21 and the upper limit of the output torque (referred to below as "torque upper limit") of the engine 21. The solid line Pmax in FIG. 3 represents the maximum engine torque curve. That is, the engine torque curve Pmax corresponds to the rated or the maximum power output of the engine 21.

The governor 25 controls the output of the engine 21 so that the output torque of the engine 21 (referred to below as "engine torque") is equal to or lower than the engine torque curve. The control of the output of the engine 21 is conducted, for example, by controlling the upper limit of a fuel injection amount to the engine 21.

The solid line P100 in FIG. 3 represents the portion of the engine torque curve (referred to below as "droop line") when the accelerator operating amount is 100%. The accelerator operating amount being 100% signifies a state in which the accelerator operating member 81 is operated at the maximum amount. The dashed line P80 represents a droop line when the accelerator operating amount is 80%. The dashed line P70 represents a droop line when the accelerator operating amount is 70%. The first control unit 10*a* changes a throttle upper limit of the engine 21 in accordance with the accelerator operating amount. As a result, the droop lines of the engine torque curve are changed in accordance with the accelerator operating amount as indicated by the solid line P100 and the dashed lines P80 and P70.

As illustrated in FIG. 2, the operating unit 8 has a setting input device 84. The setting input device 84 is a touch panel-type display input device for example. However, the setting input device 84 may be a device having a display monitor and operating keys provided separately.

The setting input device 84 has a mode selecting unit 87. The mode selecting unit 87 is a device for the operator to manually select a control mode of the tractive force from among a high-output mode and a low-output mode. Therefore, the operator is able to set the control mode to either the high-output mode or the low-output mode by operating the setting input device 84.

The output of the engine is controlled in accordance with predetermined engine torque curves in each of the modes. The solid line Pmax illustrated in FIG. 3 is a normal engine torque curve in the high-output mode. The solid line Emax illustrated in FIG. 3 is a normal engine torque curve in the low-output mode. The normal engine torque curve Emax in the low-output mode is set lower than the normal engine torque curve Pmax in the high-output mode with regard to the torque upper limit of the engine. Note that the droop line is changed in accordance with the accelerator operating amount in the normal engine torque curve Emax in the low-output mode in the same way as in the normal engine torque curve Pmax in the high-output mode.

The first control unit 10*a* receives a correction command signal from the second control unit 10*b* according to a below-mentioned tractive force level selection function. The first control unit 10*a* corrects the command value of the engine command signal based on the correction command signal and sends the corrected command value to the governor 25. The correction command signal is described in detail below.

The second control unit 10*b* controls the transmission 26 and the torque converter 23 in accordance with the traveling state of the vehicle. For example, when the automatic speed change mode is selected, the second control unit 10*b* automatically switches the gear stages of the transmission 26 in accordance with the vehicle speed. When the manual speed change mode is selected, the second control unit 10*b* switches the transmission 26 to the gear stage selected with the speed change operating member 85.

The first control unit 10*a* and the second control unit 10*b* are able to communicate with each other in a wired manner or in a wireless manner. Detection signals of the engine rotation speed, the fuel injection amount, or the accelerator operating amount and the like are inputted from the first control unit 10*a* to the second control unit 10*b*.

The second control unit 10*b* calculates a correction value for correcting the command value of the engine command signal on the basis of the detection signals in the below-mentioned tractive force level selection function. The second control unit 10*b* transmits the correction command signal corresponding to the correction value to the first control unit 10*a*. As a result, the first control unit 10*a* and the second control unit 10*b* are able to control the torque upper limit of the engine at a desired value.

Next, the tractive force level selection function will be explained. The tractive force level selection function is a function that allows the operator to manually select a tractive force level from the plurality of levels when the gear stage of the transmission 26 is the first-speed gear. In the present exemplary embodiment, tractive force levels that can be set with the tractive force level selection function include two stages: a first level and a second level.

As illustrated in FIG. 2, the setting input device 84 has a level selecting unit 88. The level selecting unit 88 is a device for the operator to manually select a tractive force level from among the first level and the second level when the gear stage of the transmission 26 is the first-speed gear.

Figure 4:
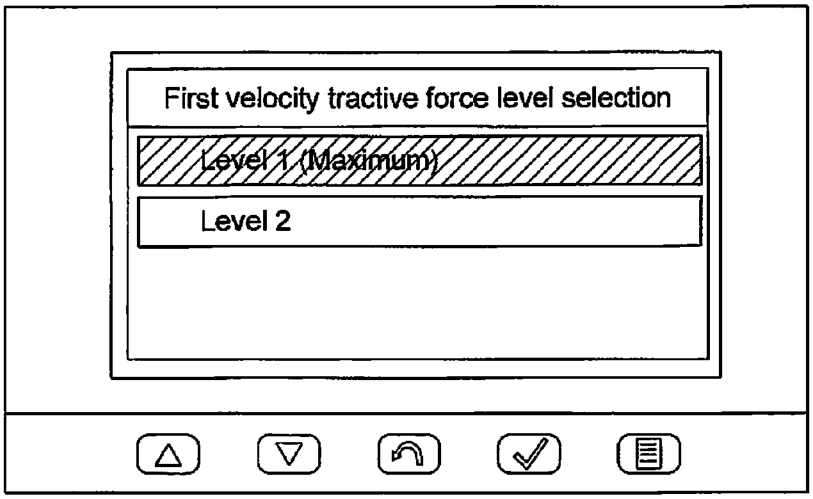
FIG. 4 is a view of an operating screen of tractive force level selection functions displayed on a setting input device.

FIG. 4 is a view of an operating screen of tractive force level selection functions displayed on the setting input device 84. The operator is able to set the tractive force level at the first-speed gear to either the first level or the second level by operating the operating screen.

Figure 5:
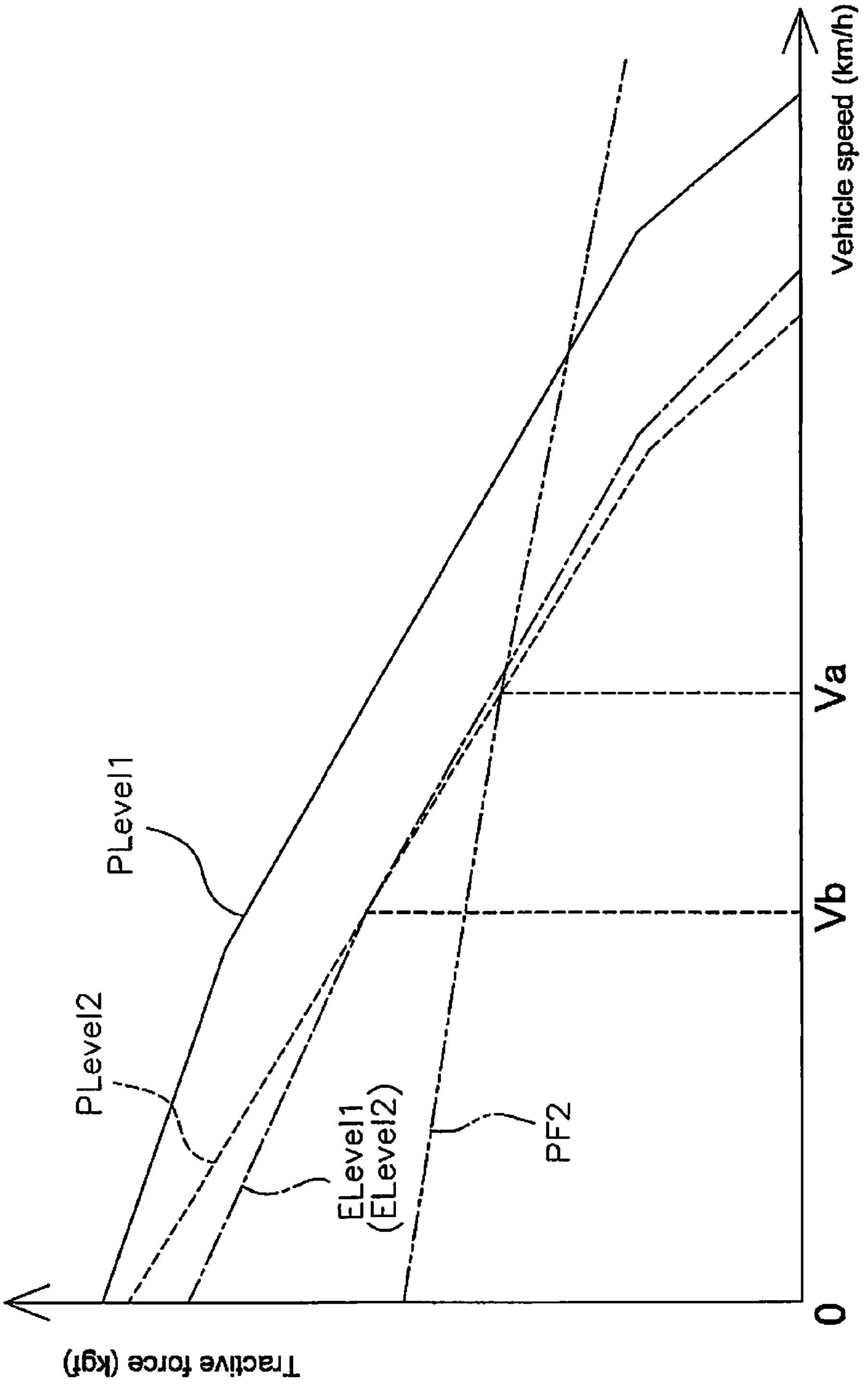
FIG. 5 illustrates tractive force characteristics of the wheel loader.

FIG. 5 illustrates tractive force characteristics when the gear stage of the transmission 26 is at the first-speed gear. The tractive force characteristics represent the relation between the vehicle speed and the tractive force of the wheel loader 1. Specifically, when the control mode of the tractive force is in the high-output mode and the gear stage of the transmission 26 is the first-speed gear and the first level is selected, the control unit 10 controls the engine 21 on the basis of a first tractive force characteristic PLevel1. The first tractive force characteristic PLevel1 is a tractive force characteristic obtained from the normal engine torque curve Pmax in the above-mentioned high-output mode. Note that to facilitate understanding, the accelerator operating amount in the following explanation is assumed to be constant at 100%.

When the control mode of the tractive force is in the high-output mode and the gear stage of the transmission 26 is the first-speed gear and the second level is selected, the control unit 10 controls the engine 21 on the basis of a second tractive force characteristic PLevel2. The tractive force is reduced more in the second tractive force characteristic PLevel2 than in the first tractive force characteristic PLevel1. As the vehicle speed decreases, the difference in the tractive force between the second tractive force characteristic PLevel2 and the first tractive force characteristic PLevel1 decreases accordingly. Therefore, the difference between the tractive force of the first level and the tractive force of the second level decreases in correspondence to a decrease in the vehicle speed.

The chain double-dashed line in FIG. 5 represents a tractive force characteristic PF2 when the gear stage of the transmission 26 is at the second-speed gear. When the gear stage of the transmission 26 is at the second-speed gear, the control unit 10 controls the engine 21 on the basis of the tractive force characteristic PF2 at the second-speed gear represented by the chain double-dashed line. As illustrated in FIG. 5, the tractive force at the second tractive force characteristic PLevel2 is larger than the tractive force at the tractive force characteristic PF2 of the second-speed gear in the velocity range at or below a prescribed vehicle speed Va. Therefore, the tractive force of the second level when the gear stage of the transmission 26 is at the first-speed gear is larger than the tractive force when the gear stage of the transmission 26 is at the second-speed gear in the velocity range at or below the prescribed vehicle speed Va.

The chain line in FIG. 5 represents a tractive force characteristic ELevel1 when the control mode of the tractive force is the low-output mode and the gear stage of the transmission 26 is at the first-speed gear. The tractive force characteristic ELevel1 is a tractive force characteristic obtained from the normal engine torque curve Emax in the above-mentioned low-output mode. The tractive force characteristic ELevel1 of the first level and a tractive force characteristic ELevel2 of the second level are the same when the control mode of the tractive force is the low-output mode. That is, the engine 21 is controlled on the basis of the tractive force characteristic ELevel1 whether the tractive force level is the first level or the second level. Therefore, when the control mode of the tractive force is the low-output mode, the tractive force is not reduced in comparison to the first level even when the second level is selected. In other words, the tractive force level selection function in the present exemplary embodiment is set only in the high-output mode and is not set in the low-output mode.

The tractive force according to the tractive force characteristic ELevel1 is smaller than the tractive force according to the first tractive force characteristic PLevel1. The tractive force at the second tractive force characteristic PLevel2 is larger than the tractive force based on the tractive force characteristic PLevel1 in the velocity range at or below a prescribed vehicle speed Vb. Therefore, the tractive force of the second level at the high-output mode is larger than the tractive force at the low-output mode in the velocity range at or below the prescribed vehicle speed Vb when the gear stage of the transmission 26 is at the first-speed gear. In other words, the tractive force of the second level at the high-output mode is a value between the tractive force of the first level in the high-output mode and the tractive force in the low-output mode in the velocity range at or below the prescribed vehicle speed Vb when the gear stage of the transmission 26 is at the first-speed gear.

As mentioned above, the tractive force is reduced more in the second tractive force characteristic PLevel2 than in the first tractive force characteristic PLevel1. Processing for reducing the tractive force is explained below. The control unit 10 reduces the tractive force of the second level to below the tractive force of the first level by reducing the throttle upper limit of the engine 21 and the torque upper limit of the engine 21. Specifically, the control unit 10 refers to tractive force reduction information illustrated in FIG. 6 to determine the throttle upper limit and a reduction amount of the torque upper limit (referred to below as "torque reduction amount") of the engine 21. The control unit 10 corrects the above-mentioned engine command signal on the basis of the throttle upper limit and the torque reduction amount. As a result, the normal engine torque curve Pmax of the high-output mode is corrected and the tractive force is reduced.

As illustrated in FIG. 6, the tractive force reduction information prescribes relationships between the vehicle speed, the throttle upper limit, and the torque reduction amount. Values other than the values described in FIG. 6 are determined by linear extrapolation. FIG. 6(A) depicts the tractive force reduction information in the high-output mode. FIG. 6(B) depicts the tractive force reduction information in the low-output mode. A vehicle speed V1 in both FIGS. 6(A) and 6(B) is zero. The vehicle speeds exhibit the relationship V1<V2<V3<V4<V5.

The tractive force reduction information is not limited to the table as illustrated in FIG. 6 and may be in the format of a map or an equation etc. The vehicle speeds as mentioned above correspond to the rotation speed of the output shaft of the transmission 26. Therefore, the vehicle speed in FIG. 6 may be replaced by rotation speeds of the output shaft of the transmission 26.

The control unit 10 determines the throttle upper limit and the torque reduction amount from the vehicle speeds on the basis of the tractive force reduction information. The control unit 10 corrects the engine command signal on the basis of the throttle upper limit and the torque reduction amount. As a result, the normal engine torque curve Pmax of the high-output mode is corrected so that the tractive force is reduced.

As illustrated in FIG. 6(A), the throttle upper limit at the first level of the high-output mode is 100% and the torque reduction amount is zero regardless of the vehicle speed. Therefore, the tractive force in the first level is not reduced with regard to the normal engine torque curve Pmax in the high-output mode.

Th1 to Th5 in FIG. 6(A) represent throttle upper limits of the second level in the high-output mode and exhibit, for example, the relationship Th1>Th2>Th3>Th4>Th5. Therefore, the throttle upper limit in the second level in the high-output mode decreases in correspondence to an increase in the vehicle speed. However, the relationship between Th1, Th2, Th3, Th4, and Th5 is not limited to the above relationship and a portion thereof may be changed. Tq1 to Tq5 represent the torque reduction amount of the second level in the high-output mode and exhibits, for example, the relationship Tq1<Tq2<Tq3<Tq4<Tq5. Therefore, the torque reduction amount in the second level in the high-output mode increases in correspondence to an increase in the vehicle speed. However, the relationship between Tq1, Tq2, Tq3, Tq4, and Tq5 is not limited to the above relationship and a portion thereof may be changed.

Figure 7:
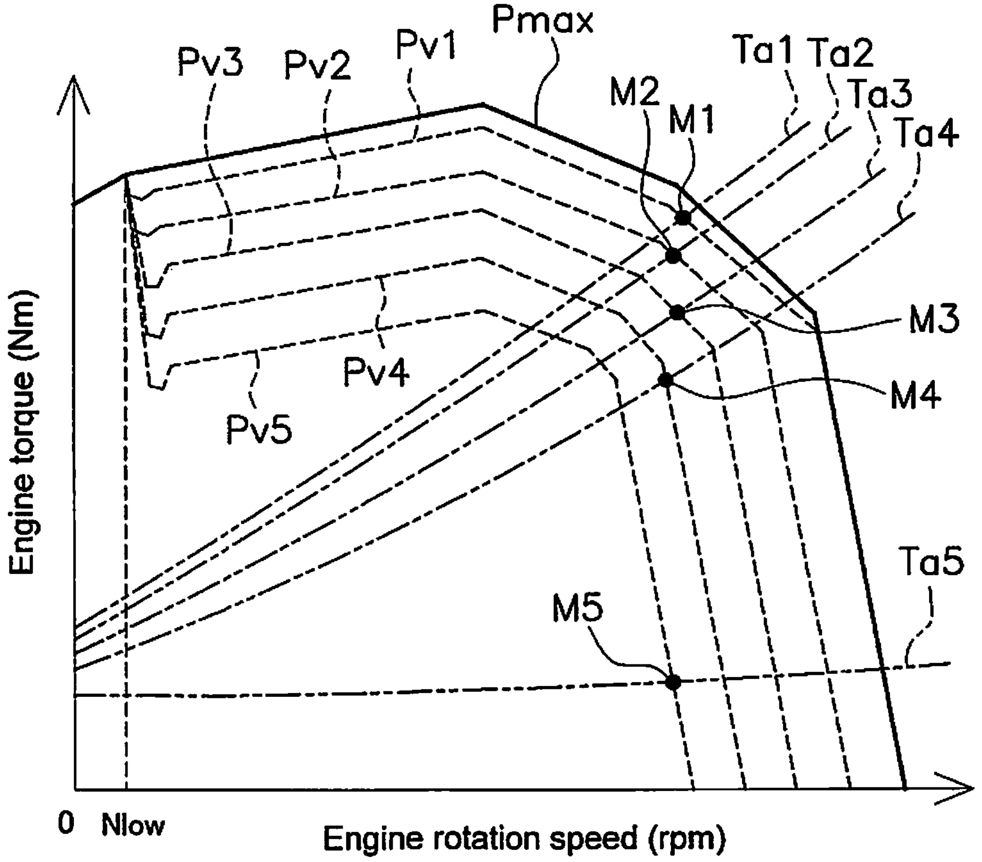
FIG. 7 illustrates an engine torque curve determined in accordance with a vehicle speed.

FIG. 7 illustrates an engine torque curve corrected on the basis of the tractive force reduction information when the second level in the high-output mode is selected. Pv1 to Pv5 in FIG. 7 are engine torque curves when the respective vehicle speeds are V1 to V5. The throttle upper limit and the torque upper limit of the engine torque curves Pv1 to Pv5 are reduced with regard to the normal engine torque curve Pmax.

The droop lines are changed due to the throttle upper limits being reduced on the basis of the tractive force reduction information. Portions of the engine torque curves outside of the droop lines (referred to as "dynamic torque lines" below) are changed due to the torque upper limits being reduced on the basis of the torque reduction amount in the tractive force reduction information. As a result, the normal engine torque curve Pmax is corrected to the engine torque curves Pv1 to Pv5 in accordance with the vehicle speed.

As illustrated in FIG. 7, the control unit 10 sets the reduction amount of the torque upper limit to zero when the rotation speed of the engine 21 is at or below a prescribed rotation speed Nlow even when the second level is selected. Therefore, the engine torque curves Pv1 to Pv5 match the normal engine torque curve Pmax and the torque upper limit is not reduced while the engine rotation speed is at or below the prescribed rotation speed Nlow. The prescribed rotation speed Nlow is, for example, a value near the idling rotation speed of the engine 21.

M1 to M5 in FIG. 7 respectively represent matching points of the engine torque curves Pv1 to Pv5 and loads on the engine 21. The loads on the engine 21 are mainly the absorbed torques of the work implement pump 13, the steering pump 12, and the torque converter 23. The control unit 10 controls the engine 21, the work implement pump 13, and the steering pump 12 so that the output torque of the engine 21 and the loads on the engine 21 are balanced at the matching points M1 to M5. The matching point M5 when the vehicle speed is V5 which is the highest among the vehicle speeds V1 to V5, is positioned on the droop line. The matching points M1 to M4 when the vehicle speeds are V1 to V4 which are lower than the vehicle speed V5, are positioned on the dynamic torque lines.

As mentioned above, the throttle upper limit is 100% and the torque reduction amount is zero regardless of the vehicle speed in the tractive force reduction information of the first level in the high-output mode. Therefore, the engine torque is controlled on the basis of the normal engine torque curve Pmax in the high-output mode. As a result, the first tractive force characteristic PLevel1 illustrated in FIG. 5 becomes the tractive force characteristic obtained from the normal engine torque curve Pmax in the above-mentioned high-output mode.

As illustrated in FIG. 6(B), the throttle upper limit is 100% and the torque reduction amount is zero regardless of the vehicle speed in either the first level or the second level in the tractive force reduction information of the low-output mode. Therefore, in the low-output mode, the engine 21 is controlled on the basis of the normal engine torque curve Emax in the low-output mode in either the first level or the second level.

Figure 8:
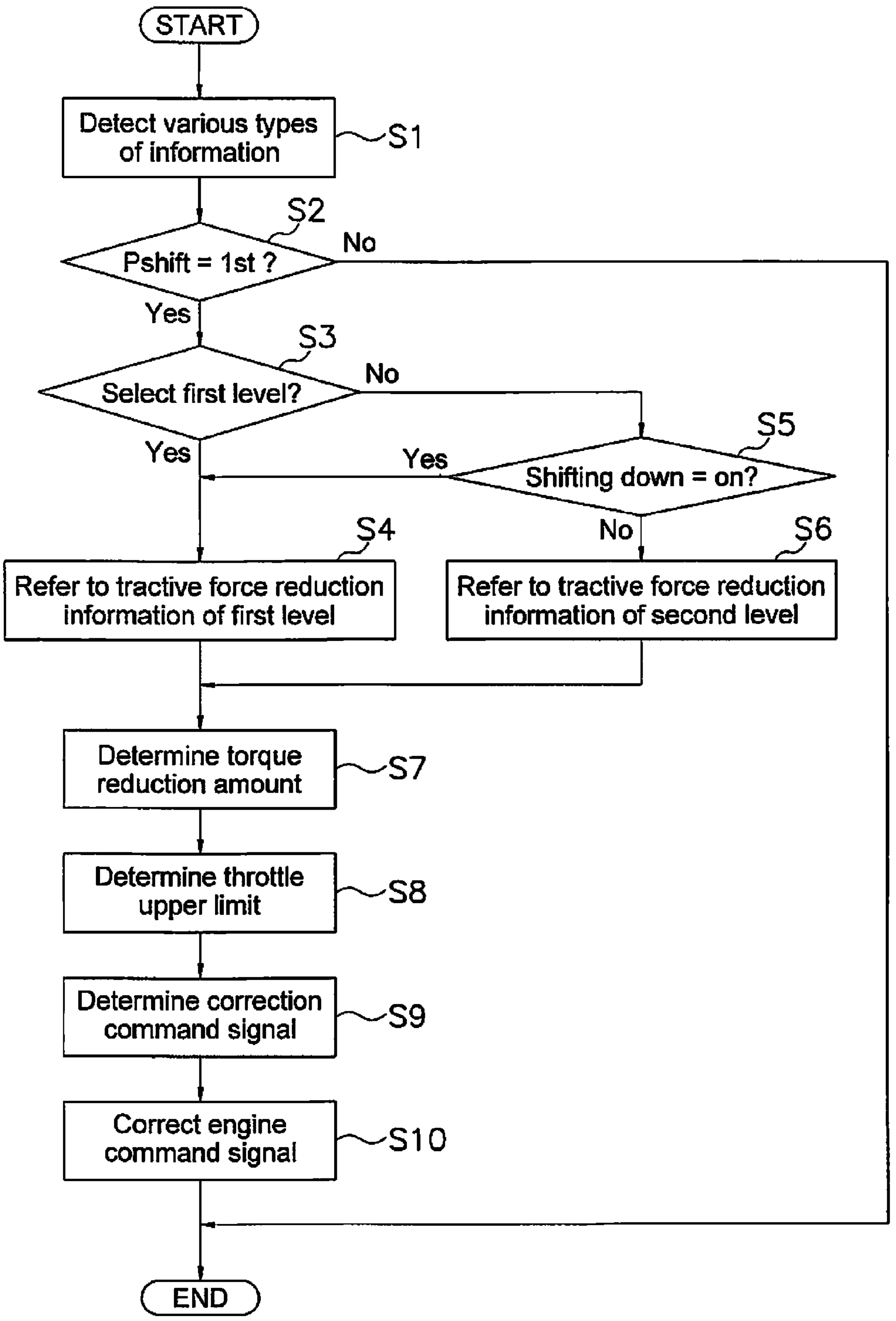
FIG. 8 is a flow chart depicting processing of the control unit in a tractive force level selection function.

FIG. 8 is a flow chart depicting processing of the control unit 10 with the tractive force level selection function. Various types of information are detected as illustrated in step S1 in FIG. 8. The information including engine rotation speed and vehicle speed are detected with detection signals from the operating unit 8 and from various sensors.

A determination is made as to whether a gear stage Pshift of the transmission 26 is in the first-speed gear or not in step S2. When the gear stage Pshift is the first-speed gear, the routine advances to step S3. When the gear stage Pshift is not the first-speed gear, the tractive force level selection function is not executed. That is, the tractive force level selection function is not executed when the gear stage Pshift is the second-speed gear or higher.

A determination is made in step S3 as to whether the first level is selected or not. When the first level is selected, the routine advances to step S4. The above-mentioned tractive force reduction information of the first level is referenced in step S4.

When the second level is selected, the routine advances from step S3 to step S5. A determination is made in step S5 as to whether the shifting-down operating member 89 is being operated or not. When the shifting-down operating member 89 is being operated, the routine advances to step S4. Therefore, even when the gear stage is the first-speed gear and the second level is selected, the tractive force level is automatically switched from the second level to the first level when the shifting-down operating member 89 is operated. When the shifting-down operating member 89 is not being operated, the routine advances to step S6. The above-mentioned tractive force reduction information of the second level is referenced in step S6.

The torque reduction amount is determined next in step S7. The throttle upper limit is determined in step S8. Therefore, when the first level is selected, the torque reduction amount and the throttle upper limit are determined on the basis of the tractive force reduction information for the first level. When the second level is selected, the torque reduction amount and the throttle upper limit are determined on the basis of the tractive force reduction information for the second level.

The correction command signal is determined in step S9. The second control unit 10*b* in this case determines the correction command signal on the basis of the torque reduction amount determined in step S7 and the throttle upper limit determined in step S8. The second control unit 10*b* outputs the correction command signal to the first control unit 10*a*. The engine command signal is corrected in the S10. The first control unit 10*a* corrects the engine command signal with the correction command signal and controls the engine 21 as described above. Note that when the throttle upper limit determined according to the accelerator operating amount is smaller than the throttle upper limit determined according to the above processing, the throttle upper limit determined according to the accelerator operating amount is determined as the throttle upper limit for determining the engine command signal.

The processing from the above steps S1 to S10 are repeatedly performed while the engine 21 is being driven. As a result, the torque reduction amount and the throttle upper limit continually change in accordance with changes in the vehicle speed. As a result, the engine torque curve is changed in accordance with the vehicle speed and as a result the abovementioned tractive force characteristics are obtained.

The above processing is performed while the wheel loader 1 is traveling forward. Processing different from the processing during forward travel may be performed while the wheel loader is traveling in reverse. For example, the tractive force level selection function may not be set while the wheel loader 1 is traveling in reverse. That is, the engine 21 may be controlled with the normal engine torque curve Pmax regardless of the tractive force level even when the gear stage is the first-speed gear while the wheel loader 1 is traveling in reverse.

The operator is able to select the tractive force level from the first level and the second level in the first-speed gear in the wheel loader 1 according to the present exemplary embodiment. The engine 21 is controlled on the basis of the first tractive force characteristic PLevel1 when the first level is selected in the high-output mode. The engine 21 is controlled on the basis of the second tractive force characteristic PLevel2 when the second level is selected in the high-output mode. As a result, the tractive force is reduced more in the second level than in the first level. As a result, the tractive force at the moment of plunging the bucket 7 into an object during excavating work is optimized in response to the type of object and the ground conditions.

Figure 9:
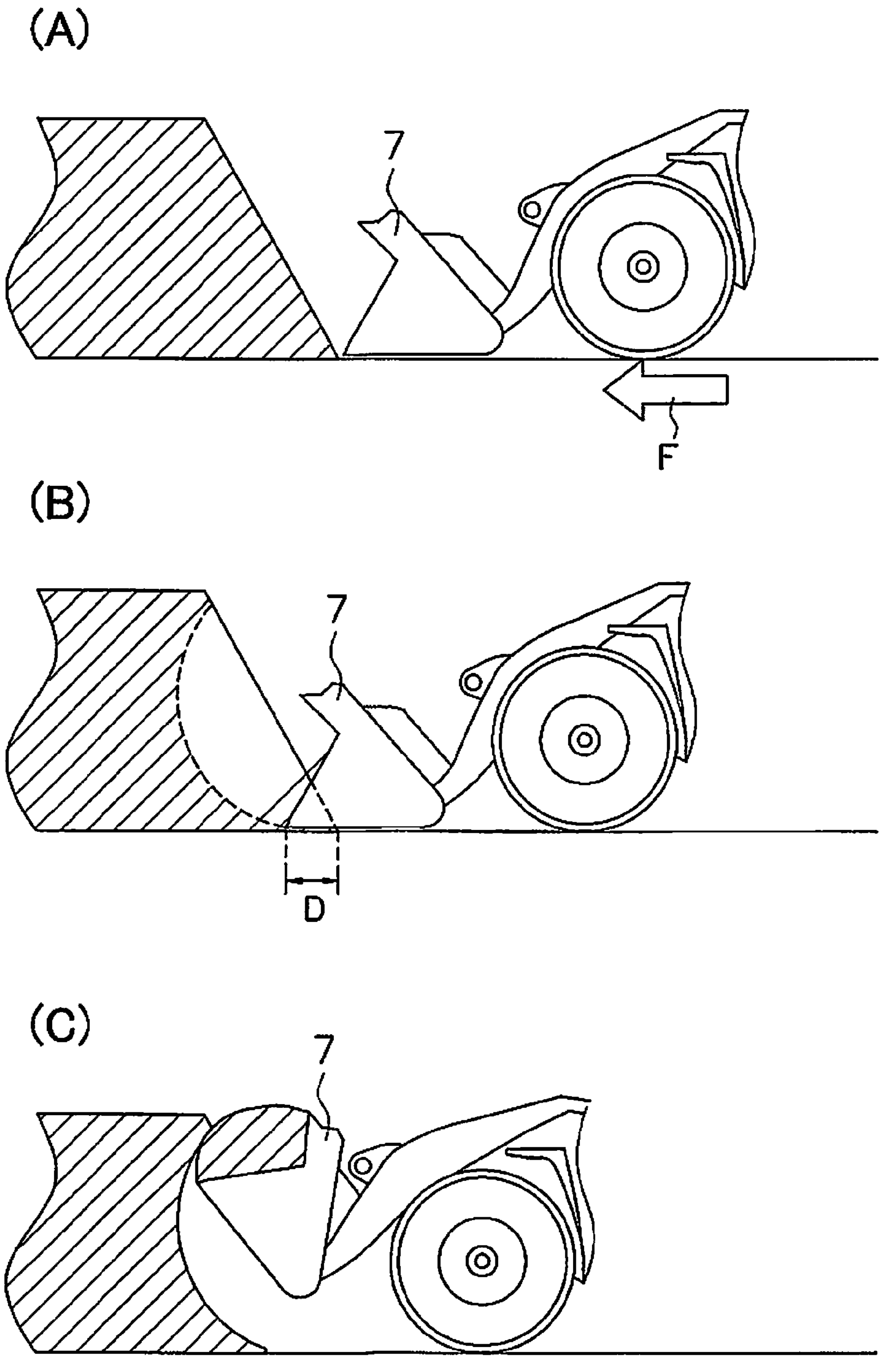
FIG. 9 illustrates an example of work conditions of a wheel loader according to an exemplary embodiment of the present invention.

Therefore, the penetration amount of the bucket 7 into the object can be suppressed from becoming too large by the operator selecting a tractive force level in the first-speed gear in accordance with the object. For example, when the object is a lightweight material or when the object is a loose material, the second level may be selected. As a result, the tractive force F at the moment the bucket 7 is plunged into the object is suppressed as illustrated in FIG. 9(A), and the penetration amount D into the object is suitably suppressed as illustrated in FIG. 9(B). Consequently, the bucket 7 can be raised easily as illustrated in FIG. 9(C).

Alternatively, slipping of the traveling wheels 4*a* and 4*b* can be suppressed by the operator selecting a tractive force level in the first-speed gear in accordance with the ground conditions. As a result, a reduction in workability or a deterioration in fuel consumption can be suppressed. The gear stage is normally set to the first-speed gear while performing excavating work. Consequently, the tractive force can be suitably reduced during excavating work by the tractive force level selection function being activated only in the first-speed gear.

The tractive force of the second level at the first-speed gear has a magnitude that is between the tractive force of the first level at the first-speed gear and the tractive force of the second-speed gear in the velocity range at or below a prescribed vehicle speed. As a result, when the tractive force in the first level at the first-speed gear is too large and the tractive force at the second-speed gear is too small, a suitable tractive force can be obtained by selecting the second level. That is, the optimal tractive force characteristics can be set between the first-speed gear and the second-speed gear in accordance with the object or the ground conditions in the wheel loader 1 equipped with the torque converter 23.

As illustrated in FIG. 5, the difference between the tractive force of the first level and the tractive force of the second level decreases in correspondence to a decrease in the vehicle speed in the high-output mode. As a result, the tractive force at the moment the work implement 3 plunges into the object can be reduced and the possibility of the tractive force becoming too small when the vehicle speed approaches zero can be suppressed by the selection of the second level.

The control unit 10 reduces the tractive force of the second level to a level below the tractive force of the first level by reducing the throttle upper limit of the engine 21 in addition to the throttle upper limit of the engine 21. Therefore, the torque upper limit of the engine 21 can be reduced directly. As a result, the tractive force can be reduced with good responsiveness in comparison to when only the throttle upper limit is reduced.

The control unit 10 makes the reduction amount of the torque upper limit of the engine 21 zero when the rotation speed of the engine 21 equals or falls below a prescribed rotation speed. As a result, a reduction in the tractive force while the rotation speed of the engine 21 is low can be suppressed. As a result, the occurrence of engine stall can be suppressed.

The control unit 10 switches the tractive force level from the second level to the first level when the shifting-down operating member 89 is operated while the gear stage is the first-speed gear and the tractive force level is the second level. As a result, the operator is able to easily switch the tractive force level to the first level by operating the shifting-down operating member 89 even when the tractive force level is set to the second level. As a result, the operator is able to easily increase the tractive force.

The tractive force level selection function is set only in the high-output mode. As a result, the operator is able to select a tractive force level at the first-speed gear in the high-output mode. An excessive drop in the tractive force at the first-speed gear can be suppressed in comparison to when the tractive force level selection function is set to the low-output mode.

Figure 10:
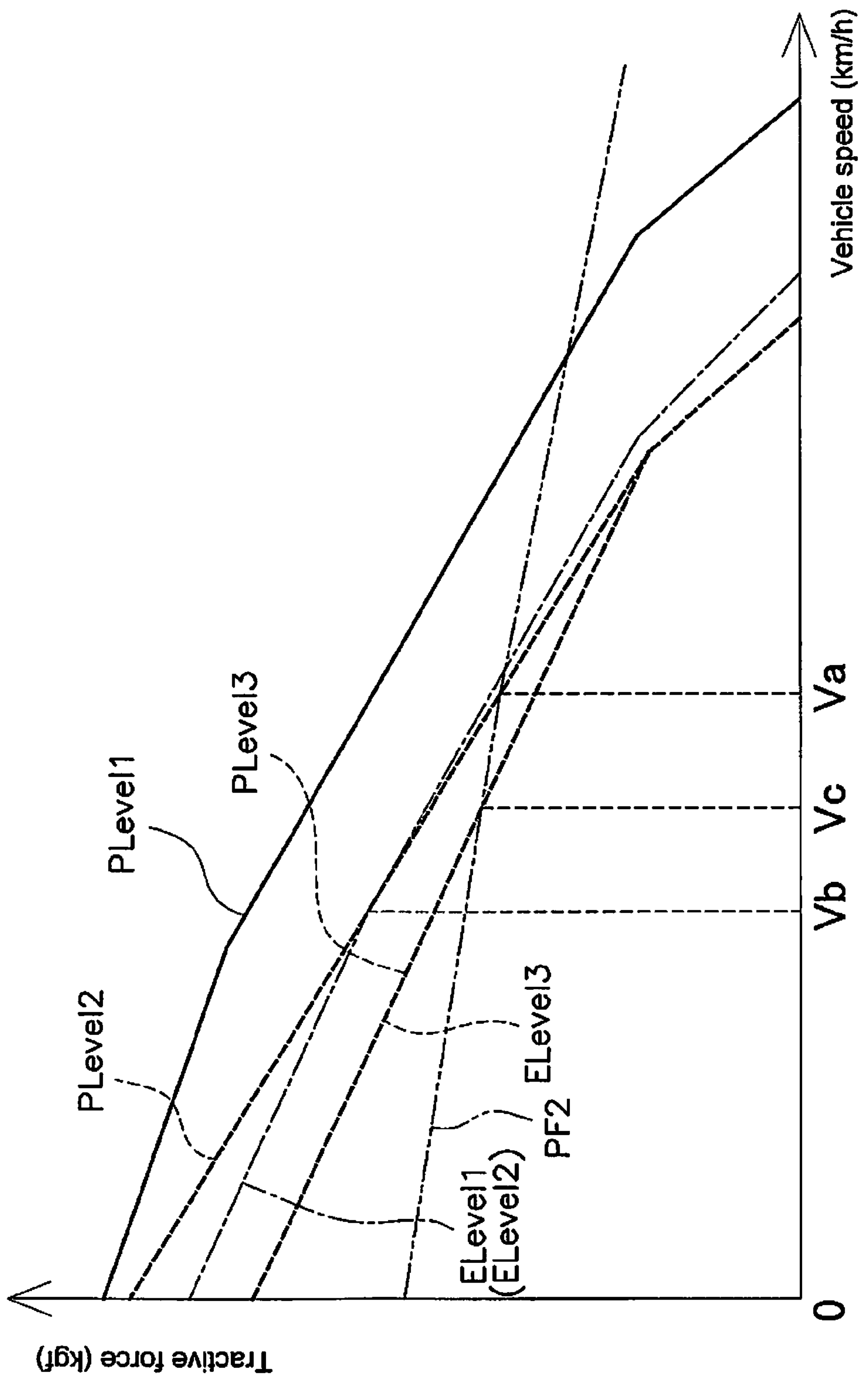
FIG. 10 illustrates tractive force characteristics of the wheel loader according to a second exemplary embodiment of the present invention.

While the number of tractive force levels described in the first exemplary embodiment is two, the number may be three or more. FIG. 10 illustrates tractive force characteristics at the first-speed gear according to a second exemplary embodiment. As illustrated in FIG. 10, the tractive force levels include the first level, the second level, and a third level. When the gear stage of the transmission 26 is the first-speed gear and the third level is selected, the control unit 10 controls the engine 21 on the basis of third tractive force characteristics PLevel3 and ELevel3 in the second exemplary embodiment.

Specifically, the first to third levels of the tractive force level are set for each of the high-output mode and the low-output mode. The control unit 10 controls the engine 21 on the basis of the third tractive force characteristic PLevel3 in the third level of the high-output mode. The tractive force is reduced more in the third tractive force characteristic PLevel3 than in the second tractive force characteristic PLevel2.

As illustrated in FIG. 10, the tractive force of the second level is less than the tractive force of the first level, and the tractive force of the third level is less than the tractive force of the second level in the high-output mode. The tractive force of the third level is larger than the tractive force of the second-speed gear in the velocity range at or below a prescribed velocity Vc in the high-output mode. The tractive force of the second tractive force characteristic PLevel2 approaches the tractive force of the third tractive force characteristic PLevel3 in correspondence to an increase in the vehicle speed in the high-output mode. The tractive force of the second tractive force characteristic PLevel2 approaches the tractive force of the first tractive force characteristic PLevel1 in correspondence to a decrease in the vehicle speed in the high-output mode.

The control unit 10 controls the engine 21 on the basis of the third tractive force characteristic ELevel3 in the third level of the low-output mode. The tractive force of the third tractive force characteristic ELevel3 is reduced more than the first tractive force characteristic ELevel1 and the second tractive force characteristic ELevel2. The third tractive force characteristic ELevel3 in the low-output mode is the same as the third tractive force characteristic PLevel3 in the high-output mode.

As illustrated in FIG. 10, the tractive force of the second level is the same as the tractive force of the first level, and the tractive force of the third level is less than the tractive force of the second level in the low-output mode. The tractive force of the third level in the low-output mode is the same as the tractive force in the third level in the high-output mode. The tractive force of the third level is larger than the tractive force of the second-speed gear in the velocity range at or below a prescribed velocity Vc in the low-output mode.

FIG. 11 illustrates tractive force reduction information according to the second exemplary embodiment. FIG. 11(A) depicts the tractive force reduction information in the high-output mode. FIG. 11(B) depicts the tractive force reduction information in the low-output mode. As illustrated in FIG. 11, the tractive force reduction information includes tractive force reduction information of the third level.

Th6 to Th10 in FIG. 11(A) represent throttle upper limits of the third level in the high-output mode and exhibit, for example, the relationship Th6>Th7>Th8>Th9>Th10. Therefore, the throttle upper limits in the third level in the high-output mode decrease in correspondence to an increase in the vehicle speed. However, the relationship between Th6, Th7, Th8, Th9, and Th10 is not limited to the above relationship and a portion thereof may be changed. Tq6 to Tq10 represent the torque reduction amounts of the third level in the high-output mode and exhibit, for example, the relationship Tq6<Tq7<Tq8<Tq9<Tq10. Therefore, the torque reduction amount in the third level in the high-output mode increases in correspondence to an increase in the vehicle speed. However, the relationship between Tq6, Tq7, Tq8, Tq9, and Tq10 is not limited to the above relationship and a portion thereof may be changed.

Th16 to Th20 in FIG. 11(B) represent throttle upper limits of the third level in the low-output mode and exhibit, for example, the relationship 100%>Th16=Th17=Th18=Th19>Th20. Therefore, the throttle upper limits of the third level in the low-output mode are less than 100% and are approximately the same regardless of the vehicle speed. However, the relationship between Th16, Th17, Th18, Th19, and Th20 is not limited to the above relationship and a portion thereof may be changed. The following relationships are exhibited: Th6>Th16, Th7>Th17, Th8>Th18, Th9>Th19, and Th10>Th20. Tq16 to Tq20 represent the torque reduction amounts of the third level in the low-output mode and exhibit, for example, the relationship Tq16<Tq17<Tq18<Tq19<Tq20. Therefore, the torque reduction amount in the third level in the low-output mode increases in correspondence to an increase in the vehicle speed. However, the relationship between Tq16, Tq17, Tq18, Tq19, and Tq210 is not limited to the above relationship and a portion thereof may be changed.

The tractive force reduction information of the first level and the second level in the high-output mode is the same as the tractive force reduction information of the first level and the second level in the high-output mode according to the first exemplary embodiment. The tractive force reduction information of the first level and the second level in the low-output mode is the same as the tractive force reduction information of the first level and the second level in the low-output mode according to the first exemplary embodiment.

Figure 12:
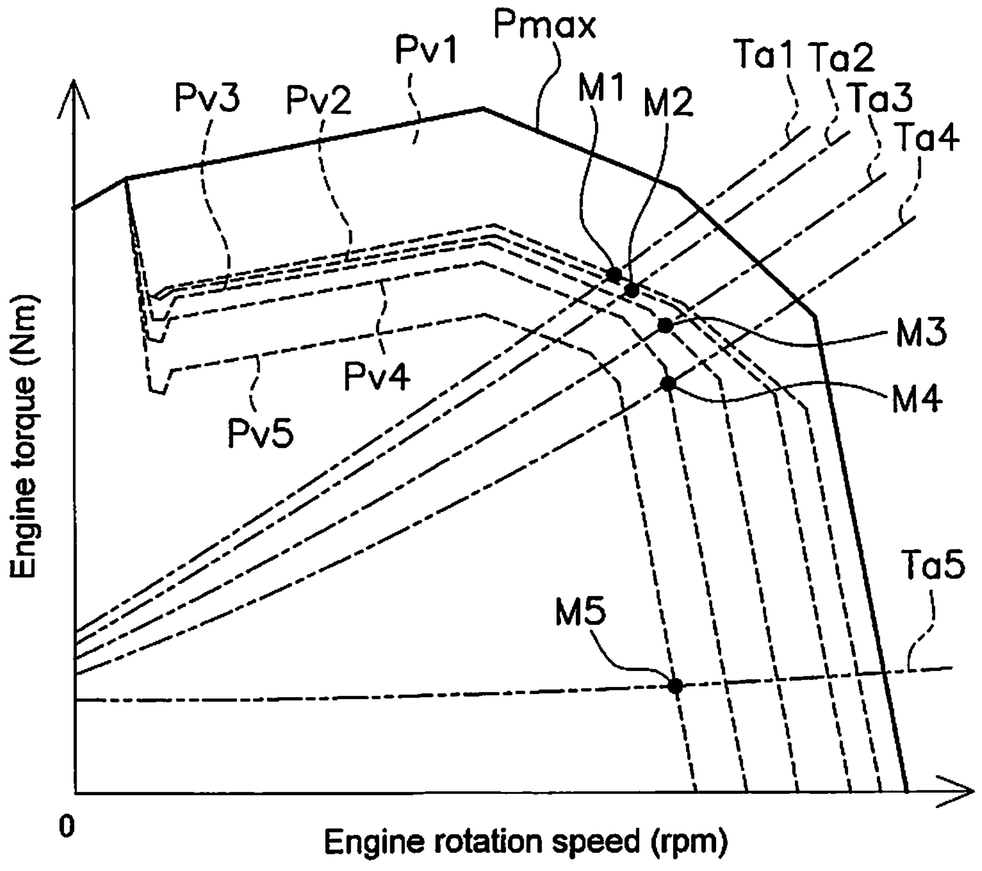
FIG. 12 illustrates engine torque curves according to the second exemplary embodiment.
Figure 13:
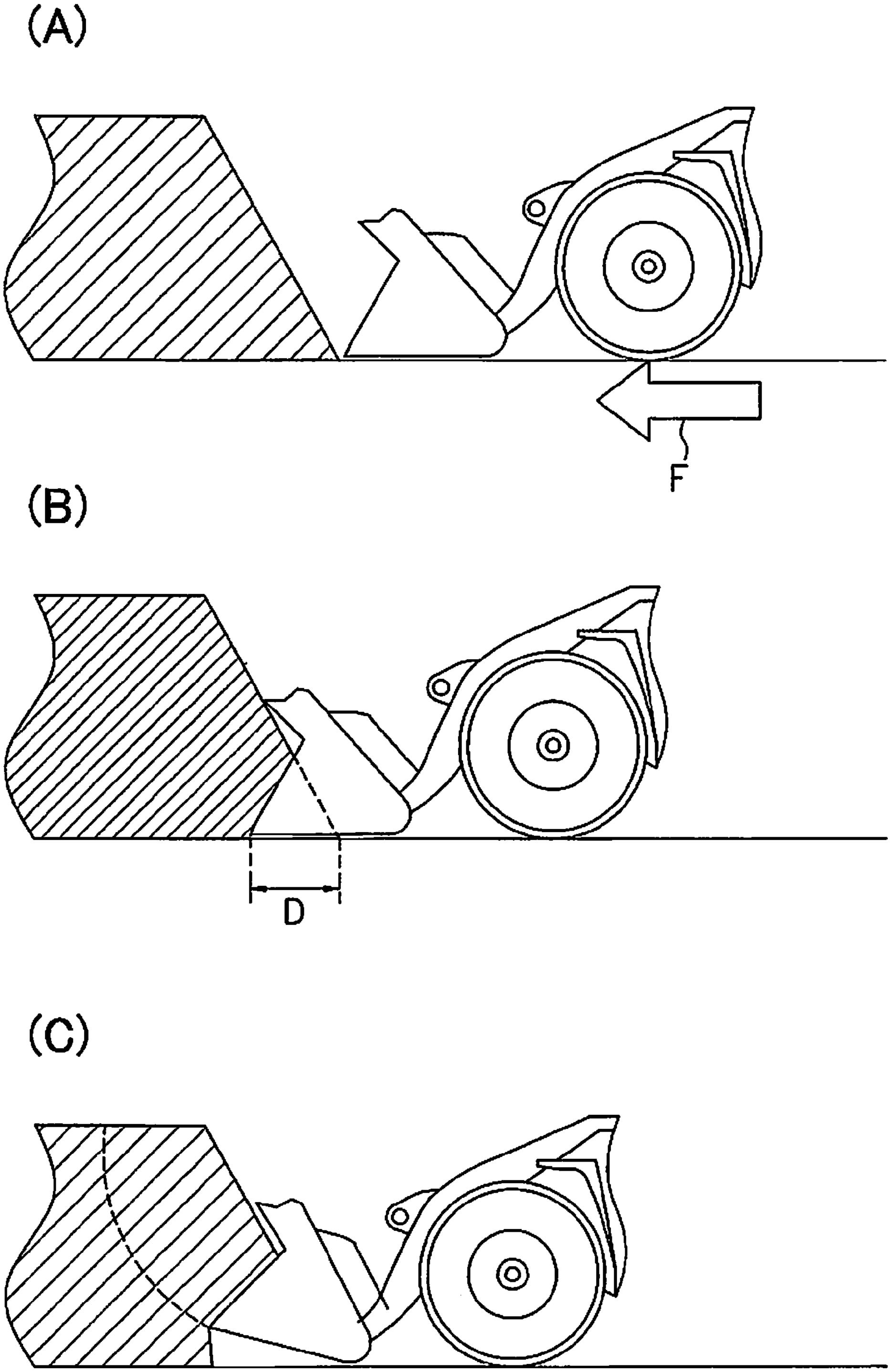
FIGS. 13(A)-13(C) illustrate an example of work conditions of a wheel loader according to conventional technique.

The engine torque curve of the second level in the high-output mode in the second exemplary embodiment is the same as the engine torque curve of the second level in the high-output mode in the first exemplary embodiment illustrated in FIG. 7. FIG. 12 illustrates the engine torque curves of the third level in the high-output mode. As illustrated in FIG. 12, the torque upper limits of the engine torque curves of the third level are greatly reduced in comparison to the engine torque curves of the second level. Other configurations are the same as those of the first exemplary embodiment and detailed explanations will be omitted.

The operator is able to set the tractive force level while the gear stage is at the first-speed gear to the three stages including the first to third levels in the second exemplary embodiment as described above. In this case, the operator is able to further reduce the tractive force while excavating by setting the tractive force level to the third level. The operator is also able to prevent an excessive drop in the tractive force while excavating by setting the tractive force level to the second level.

Although exemplary embodiments of the present invention have been described so far, the present invention is not limited to the above exemplary embodiments and various modifications may be made within the scope of the invention.

While the first control unit 10*a* and the second control unit 10*b* are provided separately in the wheel loader 1 according to the above exemplary embodiments, the first control unit 10*a* and the second control unit 10*b* may be provided in an integrated manner. For example, the functions of the first control unit 10*a* and the second control unit 10*b* may be realized by one computer. Conversely, the functions of the first control unit 10*a* or the second control unit 10*b* may be distributed among a plurality of computers.

The tractive force level may be set to the low-output mode in the first exemplary embodiment. That is, the tractive force of the second level may be reduced to be less than the tractive force of the first level in the low-output mode. Similarly, the tractive force of the second level may be reduced to be less than the tractive force of the first level in the low-output mode in the second exemplary embodiment. In this case, the tractive force of the second level may be set as a tractive force between the first level and the third level in the low-output mode.

According to the present invention, a wheel loader that is able to optimize a tractive force at the moment of plunging a bucket into an object during excavating work in response to the type of object and the ground conditions, and a control method for the wheel loader can be provided.

What is claimed is:

1. A wheel loader comprising:

an engine;

a hydraulic pump driven by the engine;

a work implement having a bucket and driven by hydraulic fluid discharged from the hydraulic pump;

traveling wheels driven by the engine;

a travel drive device configured and arranged to transmit driving power from the engine to the traveling wheels, the travel drive device including a torque converter and a transmission, the transmission including at least a first-speed gear and a second-speed gear;

a level selecting unit for selecting a tractive force level of the wheel loader when the transmission is in the first-speed gear, the tractive force level being selectable from among a plurality of levels including at least a first level and a second level; and a control unit for controlling the engine, the control unit being configured to control the engine on the basis of a first tractive force characteristic that prescribes a first relationship between a vehicle speed and a tractive force of the vehicle when the transmission is in the first-speed gear and the first level is selected; and control the engine on the basis of a second tractive force characteristic that prescribes a second relationship between the vehicle speed and the tractive force of the vehicle when the transmission is in the first-speed gear and the second level is selected, the second tractive force characteristic having a tractive force that is reduced in comparison with the first tractive force characteristic.

2. The wheel loader according to claim 1, wherein a difference between the tractive force of the first level and the tractive force of the second level decreases in correspondence with a decrease in the vehicle speed.

3. The wheel loader according to claim 1, wherein the control unit reduces the tractive force of the second level more than the tractive force of the first level by reducing a throttle upper limit of the engine.

4. The wheel loader according to claim 1, wherein the control unit reduces the tractive force of the second level more than the tractive force of the first level by reducing an upper limit of an output torque of the engine.

5. The wheel loader according to claim 1, wherein the control unit reduces the tractive force of the second level more than the tractive force of the first level by reducing a throttle upper limit of the engine and by reducing an upper limit of an output torque of the engine.

6. The wheel loader according to claim 4, wherein the control unit sets a reduction amount of the upper limit of the output torque of the engine to zero when a rotation speed of the engine is equal to or less than a prescribed rotation speed.

7. The wheel loader according to claim 1, further comprising
a shifting-down operating member for shifting the transmission from a current gear to a lower-speed gear,
the control unit switching the tractive force level from the second level to the first level when the shifting-down operating member is operated while the tractive force level is the second level.

8. The wheel loader according to claim 1, wherein
the plurality of levels further includes a third level; and
the control unit controls the engine on the basis of a third tractive force characteristic in which the tractive force is reduced more than that of the second tractive force characteristic, when the transmission is in the first-speed gear and the third level is selected.

9. The wheel loader according to claim 8, further comprising
a mode selecting unit for selecting a control mode of the tractive force from a plurality of modes that includes a high-output mode and a low-output mode; and
the tractive force in the low-output mode is smaller than the tractive force in the high-output mode.

10. The wheel loader according to claim 9, wherein
the tractive force level is set for each of the high-output mode and the low-output mode.

11. The wheel loader according to claim 9, wherein
the tractive force level is set to only the high-output mode.

12. The wheel loader according to claim 10, wherein
the tractive force when the control mode of the tractive force is the high-output mode and the tractive force level is the third level is the same as the tractive force when the control mode of the tractive force is the low-output mode and the tractive force level is the third level.

13. The wheel loader according to claim 10, wherein
the tractive force when the control mode of the tractive force is the low-output mode and the tractive force level is the first level is the same as the tractive force when the control mode of the tractive force is the low-output mode and the tractive force level is the second level.

14. The wheel loader according to claim 1, wherein
when the transmission is in the second-speed gear, the control unit controls the engine on the basis of the second tractive force characteristic; and
the tractive force of the second level at the first-speed gear is larger than the tractive force at the second-speed gear at least in a velocity range equal to or less than a prescribed vehicle speed.

15. A control method for a wheel loader comprising an engine, a hydraulic pump driven by the engine, a work implement having a bucket and driven by hydraulic fluid discharged from the hydraulic pump, traveling wheels driven by the engine, and a travel drive device configured and arranged to transmit driving power from the engine to the traveling wheels, the travel drive device including a torque converter and a transmission, the transmission including at least a first-speed gear and a second-speed gear, the method comprising
setting a level selected from a plurality of levels including at least a first level and a second level as a tractive force level when the transmission is in the first-speed gear velocity; and
controlling the engine on the basis of a second tractive force characteristic when the transmission is the first-speed gear and the second level is selected, the second tractive force characteristic having a tractive force reduced more than a tractive force of a first tractive force characteristic when the first level is selected.

16. The wheel loader according to claim 1, wherein
the level selecting unit is a device configured for an operator to manually select the tractive force level.

* * * * *